United States Patent [19]

Javeri

[11] 4,204,157
[45] May 20, 1980

[54] PERIODIC ENGINE SPEED MONITORING CIRCIT UTILIZING SAMPLING CIRCUITRY

[75] Inventor: Rupin J. Javeri, Elk Grove Village, Ill.

[73] Assignee: Motorola, Inc., Schaumburg, Ill.

[21] Appl. No.: 905,253

[22] Filed: May 12, 1978

[51] Int. Cl.[2] .............................................. G01P 3/42
[52] U.S. Cl. .................................. 324/166; 361/242; 123/102; 340/671
[58] Field of Search ................ 324/161, 163, 166–170, 324/173–175; 123/97 R, 102; 307/351; 361/236, 240, 242

[56] References Cited

U.S. PATENT DOCUMENTS

| 3,563,219 | 2/1971 | Mieras | 324/169 |
| 3,743,940 | 7/1973 | Yamagata | 324/166 |
| 4,057,740 | 11/1977 | Arguello | 307/273 |

Primary Examiner—Rudolph V. Rolinec
Assistant Examiner—Walter E. Snow
Attorney, Agent, or Firm—Phillip H. Melamed; Melvin A. Klein; James W. Gillman

[57] ABSTRACT

Electronic signal processing circuitry for use in the ignition system of an internal combustion engine is disclosed herein. A signal generator which receives crankshaft position pulses from a sensor and produces periodic outut pulses which have durations equal to a constant percentage of the period of the input sensor pulses is disclosed. The generator includes a crankshaft position sensor feeding a bistable flip-flop which controls a dual slope integrator circuit having its output coupled to a comparator with the comparator output coupled back to the reset terminal of the flip-flop. The generator produces pulses at the output of the flip-flop which have durations equal to a constant percentage of the period of the crankshaft position sensor pulses. An engine speed monitoring circuit receives the periodic varying ramp signal produced by the dual slope integrator and via sampling circuitry produces an output signal related to engine speed whose magnitude is updated during each cycle of the crankshaft position pulses.

3 Claims, 4 Drawing Figures

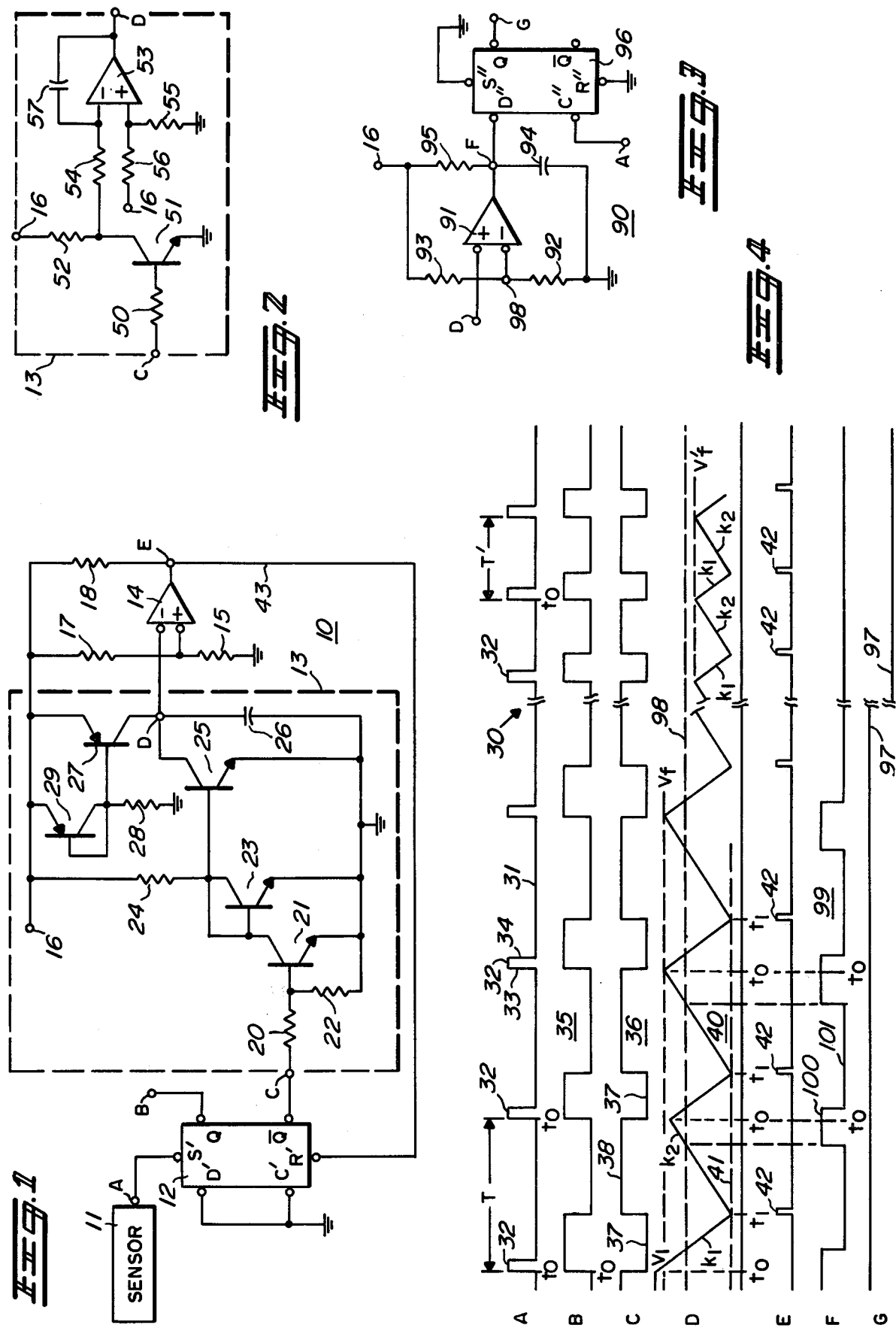

PERIODIC ENGINE SPEED MONITORING CIRCIT UTILIZING SAMPLING CIRCUITRY

CROSS-REFERENCE TO RELATED APPLICATIONS

The subject matter of the present invention is related to the subject matter contained in a copending U.S. patent application entitled, "Ignition Dwell Circuit for an Internal Combustion Engine", by Adelore Petrie and Rupin J. Javeri, Ser. No. 905,260, filed May 12, 1978, which is assigned to Motorola, Inc. The copending application illustrates another use for the waveforms generated by the circuitry shown in FIGS. 1 and 2 of the present application.

BACKGROUND OF THE INVENTION

The present invention generally relates to the field of electrical signal processing circuitry and more particularly to the use of such circuitry for controlling the dwell and spark ignition in an ignition system for an internal combustion engine.

It has been recognized that the present day mechanical ignition systems for automobiles and similar vehicles cannot meet the requirement for reliably controlling the spark timing and dwell of an internal combustion engine over the estimated lifetime of the engine. Thus many prior art solid state ignition systems have been proposed for electronically controlling the dwell and spark ignition of an internal combustion engine and thereby conserving fuel and reducing pollution by increasing the efficiency of the engine.

In addition, most prior art electronic ignition systems are unable to initiate dwell at a precise time before the occurrence of a crankshaft sensor position pulse. The prior art systems have generally been unable to accurately monitor the engine speed and update this speed monitoring information during each crankshaft rotation.

Thus while the prior art electronic ignition systems have avoided some of the disadvantages of the mechanical ignition systems caused by the wearing out of mechanical parts, the accuracy of prior art electronic ignition systems leaves much to be desired.

SUMMARY OF THE INVENTION

Accordingly, it is an object of the present invention to provide an improved signal processing circuit adaptable for use with the ignition system of an internal combustion engine.

It is a further object of the present invention to provide an engine speed monitoring circuit in which a signal having a magnitude related to engine speed is generated and the magnitude of this signal is updated during each crankshaft rotation.

In one embodiment of the present invention an improved engine speed monitoring circuit is provided. The monitoring circuit comprises: sensor means for producing variable period signal pulses wherein the period of the pulses is related to engine speed; means coupled to said sensor means for receiving said signal pulses and periodically generating, in response thereto, a signal having a magnitude varying at a predetermined rate and having a peak magnitude related to the period of the signal pulses, the peak magnitude thereby also being related to engine speed, and wherein said peak magnitude occurs at the occurrence of said input signal pulses; and sampling means coupled to said sensor means and said varying magnitude signal generating means for producing an output signal related to the peak magnitude of said varying magnitude signal by utilizing said signal pulses to insure that the magnitude of said varying signal, only during said signal pulses, determines said output signal.

Essentially, crankshaft position pulses are coupled to the clock terminal of a D-type flip-flop and in this manner the output terminal of the flip-flop monitors the signal at the data terminal of the flip-flop only during the existence of the crankshaft position pulses. Circuitry is provided for developing a periodic varying magnitude signal having peaks which are synchronized with the occurrence of the crankshaft position signal pulses and wherein the magnitude of these peaks are related to the period of the crankshaft position pulses and thereby also related to the engine speed. The periodic varying magnitude signal is used to determine an input to the flip-flop data terminal. By utilizing the crankshaft position pulses, the output terminal of the D-type flip-flop provides engine speed information which is effectively updated for each crankshaft position pulse that is produced. Thus an almost instantaneous measure of engine speed is provided and this flip-flop output level representing engine speed is maintained until it is updated by subsequent information provided during the next crankshaft rotation.

BRIEF DESCRIPTION OF THE DRAWINGS

For a more complete understanding of the invention reference should be made to the drawings, in which:

FIG. 1 is a schematic diagram of a signal generator adaptable for use in an ignition system in which periodic output pulses are produced having durations equal to a precise percentage of the period of an input signal;

FIG. 2 is a schematic diagram illustrating an alternate embodiment for a period of the circuit illustrated in FIG. 1;

FIG. 3 is a schematic diagram of an engine speed monitoring circuit which utilizes the waveforms developed by the circuit illustrated in FIG. 1; and FIG. 4A–G are graphs illustrating the amplitude of various signals produced by the circuits shown in FIGS. 1–3.

DESCRIPTION OF THE PREFERRED EMBODIMENT

Referring now to FIG. 1, a signal generator 10 is illustrated which receives a periodic input signal and produces periodic output pulses that have durations equal to a precise percentage of the input signal period. The signal generator 10 basically comprises an input sensor 11, a D-type flip-flop circuit 12 connected as an S-R flip-flop, a dual slope integrating circuit 13 (shown dashed) and a voltage comparator 14.

Preferably, the signal generator 10 is intended for use in the ignition system of an internal combustion engine and the sensor 11 corresponds to a crankshaft position sensor for producing periodic input pulses having leading and trailing edges at an output terminal A, wherein the period of these input pulses is variable and related (inversely proportional) to the rotational speed of the crankshaft of the engine since the occurrence of these pulses is determined by predetermined rotational positions of the engine crankshaft (not shown). The sensor 11 can be either a magnetic sensor or, preferably, a Hall effect sensor.

The terminal A of the sensor 11 is directly coupled to a set terminal S' of the flip-flop 12. Data and clock terminals (D' and C', respectively) of the flip-flop are both directly connected to ground potential and a flip-flop output terminal Q is directly connected to an output terminal B while an additional flip-flop output terminal $\overline{Q}$ is directly connected to a terminal C which is the input terminal of the dual slope integrating circuit 13. A terminal D is the output terminal of the dual slope circuit 13 and is directly connected as an input to a negative input terminal of the comparator 14. A positive input terminal of the comparator 14 is connected to ground through a resistor 15 and connected to a positive voltage supply terminal 16 through a resistor 17. A terminal E represents the output terminal of the comparator 14 and is coupled to the positive voltage supply terminal 16 through a resistor 18 and is directly connected to a reset terminal R' of the flip-flop circuit 12.

The dual slope integrating circuit 13, as shown in FIG. 1, comprises a resistor 20 coupled between the terminal C and the base of an NPN transistor 21 which is also connected to ground through a resistor 22. The emitter of the transistor 21 is connected to ground and the transistor's collector is directly connected to both the base and collector electrodes of an NPN transistor 23 which has its emitter directly connected to ground. The collector of transistor 23 is connected to the voltage supply terminal 16 through a resistor 24 and is directly connected to the base of an NPN transistor 25 which has its emitter directly connected to ground and its collector directly to the output terminal D. An integrating capacitor 26 is coupled between the terminal D and ground and a PNP transistor 27 has its collector electrode directly connected to the terminal D and its emitter electrode connected to the terminal 16. The base of the transistor 27 is connected to ground through a resistor 28 and is directly connected to the base and collector electrodes of a PNP transistor 29 which has its emitter directly connected to the terminal 16. The components 20-29 comprise the dual slope integrating circuit 13 shown in FIG. 1. FIG. 2 illustrates another embodiment of the dual slope integrating circuit 13 which has precisely the same input and output operating characteristics.

The operation of the signal generator circuit 10 shown in FIG. 1 will now be described with reference to the signal waveforms illustrated in FIGS. 4A through 4E which directly correspond to the signal waveforms produced at the terminals A–E in FIG. 1, respectively. The waveforms in FIGS. 4A–E represent voltage waveforms wherein the vertical axis represents amplitude and the horizontal axis represents time. A breakpoint 30 is shown in the time axis of these waveforms and the waveforms to the right of the breakpoint represent those signals produced at an engine crankshaft speed which is approximately twice the engine crankshaft speed that produced the waveforms to the left of the breakpoint. In all of the drawings, identical reference numbers and letters are used to identify identical components, terminals signals and reference voltage levels.

As previously mentioned, the crankshaft position sensor 11 produces a sensor signal designated by the reference number 31 and shown in FIG. 4A. This signal 31 comprises a plurality of variable period input signal pulses 32 wherein each pulse occurs at a predetermined rotational position of the engine crankshaft. Each pulse has a leading edge 33 and a trailing edge 34. FIG. 4A illustrates that the pulses produced to the left of the breakpoint 30 occur at a period T wherein this period is variable and is inversely proportional to the rotational speed of the engine crankshaft. To the right of the breakpoint 30, the signal 31 is illustrated as having a period T' which represents a higher engine crankshaft rotational speed, approximately twice the rotational speed that created the signal 31 to the left of the breakpoint 30. While FIGS. 4A–E illustrate signals with constant periods to the right and left of the breakpoint 30, it should be noted that the input signal period is related to the engine crankshaft speed and therefore is contemplated as being variable. FIGS. 4A–E are merely shown with two different constant periods to clarify the explanation of the operation of the present invention.

In FIG. 4A each sensor pulse 32 is illustrated as occurring at a time $t_0$, wherein the time from one $t_0$ to the next represents the period T of the signal 31, which as previously mentioned can be created by a Hall effect sensor probe. The pulses 32 are received at the set terminal S' of the bistable flip-flop circuit 12. FIGS. 4B and 4C illustrate the outputs of the flip-flop circuit 12 at the output terminals Q and $\overline{Q}$, respectively, as well as the signals created at the terminals B and C, respectively. The signal produced at terminal B is designated by the reference number 35 whereas the signal produced at the terminal C is designated by the reference numeral 36. Each signal comprises first and second logic states and the logic states of signal 35 are the inverse of the logic states of signal 36.

In response to each sensor pulse 32 received at the set terminal S', the flip-flop circuit 12 creates a low logic signal 37 at the terminal C. Subsequently, after precisely one-third of the period T has elapsed, the signal 36 will be switched to a second positive logic state 38 and the signal 36 will retain this second logic state until the next input sensor pulse 32. The manner by which the signal 36 is caused to switch logic states after the elapsing of precisely one-third of the period T will now be discussed.

FIG. 4D illustrates a dual ramp (saw-toothed) signal 40 which represents the voltage at the terminal D which is the voltage maintained at one terminal of the capacitor 26. Initially, at the time $t_0$ the voltage 40 is assumed to be at an initial value $V_i$. In response to the low logic state 37 produced at the terminal C, wherein the low logic state corresponds to ground potential, the transistor 21 is turned off and this results in turning on the transistor 23 and having the transistor 25 discharge the capacitor 26 at a constant predetermined rate. This constant discharging rate is illustrated in FIG. 4D by the linear slope $k_1$ and this rate of discharge is determined by the current passing through the resistor 24, minus any charging current supplied by the transistor 27. This is because the transistor 23 is essentially connected as a diode and the current through the resistor 24 determines the voltage developed by the diode connected transistor 23. Since transistor 25 has its base-emitter junction biased by the voltage developed by the diode connected transistor 23, the transistor 25 will also conduct precisely the same current that is being drawn through the resistor 24. Thus the combination of the components 23 through 25 represents a constant current source that results in discharging the capacitor 26 at a predetermined rate $k_1$ which results in decreasing the voltage across the capacitor, corresponding to the signal 40, at the same rate.

The voltage at the terminal D is monitored by the comparator 14 which compares this voltage to a predetermined first reference level voltage determined by the resistor divider network comprising the resistors 15 and 17. This first reference level voltage corresponds to the voltage at the junction between the resistors 15 and 17 and is illustrated in FIG. 4D by the dashed reference line 41. Until the signal 40 at the terminal D is decreased enough so that its magnitude equals the reference level voltage 41, the output of the comparator 14 at the terminal E will remain constant and at a low level. When the capacitor voltage signal 40 has its magnitude decreased to such an extent that it equals the reference level 41, the comparator 14 will produce a reset pulse 42 as shown in FIG. 4E. This occurs at a time $t_1$ after the time $t_0$. The reset pulse 42 is coupled to the reset terminal R' of the flip-flop 12 by a conductor 43 shown in FIG. 1. This reset pulse switches the logic state of the signal 36 of the terminal C to the second logic state 38. With the signal 36 having a magnitude corresponding to the second logic state 38, which corresponds to a high voltage logic state, this results in turning on the transistor 21. With the transistor 21 turned on, the transistors 23 and 25 will be turned off thereby preventing the discharge of the capacitor 26 by means of the current drawn by the transistor 25.

Whenever the transistor 25 is not discharging the capacitor 26, the transistors 27 and 29 will charge up the capacitor at a constant predetermined rate $k_2$ (slower than the rate $k_1$) determined by the magnitude of the resistor 28. The components 27–29 represent a constant current source which functions identically to the constant current source created by the components 23–25. Thus the signal 40, corresponding to the voltage at the capacitor terminal D, will be increased at a constant predetermined rate determined by the magnitude of the resistor 28 and this constant rate of increase is illustrated in FIG. 4D by a straight line segment having a positive slope $k_2$, whereas the slope $k_1$ and a negative polarity. Since the magnitude of the voltage at the terminal D is now increasing at the rate $k_2$, this results in terminating the pulse 42 produced by the comparator 14, and the magnitude of the signal 40 continues to increase until a crankshaft position pulse 32 is again received at the set terminal S' of the flip-flop 12, which results in recommencing the entire previously described cycle.

Thus essentially a bistable flip-flop circuit 12 is used to produce first and second logic state signals 37 and 38 to control a dual slope rate changing circuit 13 that charges and discharges a capacitor 26 to produce a time varying signal 40 having a magnitude that varies at a first predetermined rate $k_1$ with a negative polarity and then at a second predetermined rate $k_2$ with a positive polarity. A standard DC voltage level comparator 14 is used to monitor the magnitude of the signal 40 and produce reset pulses 42 when this magnitude equals a voltage reference level 41. These reset pulses 42 are coupled to the reset terminal R' of the flip-flop circuit 12 and result in resetting the flip-flop. This reset mode is maintained until a subsequent input pulse 32 is again received at the set terminal S' of the flip-flop.

It has been found that the circuitry illustrated in FIG. 1 and described above is capable of precisely dividing the input period T of the sensor signal 31 into any desired fraction by insuring that the rate $k_2$ has an absolute magnitude less than the rate $k_1$. Or in other words, whenever the rate $k_2$ is a slower rate of change than the rate $k_1$, the circuitry in FIG. 1 will precisely divide the input signal period T and produce a waveform representative of this precise division. This can be seen by analyzing the signal relationships represented by the following four equations.

Positive peak values of the waveform 40 result at the time occurrence $t_0$ of the crankshaft position sensor pulses 32. The magnitude of these positive peaks can be represented by the following equation:

$$V_f = (T - \frac{V_{f-1}}{k_1})k_2 + V_{ref}, \quad (1)$$

where $V_f$ represents the positive peak, T represents the period of the signal 31, $k_1$ and $k_2$ represent the rates of change of the signal 40, $V_{ref}$ is the reference level 41 and $V_{f-1}$ represents the peak value of the signal 40 at the previous occurrence of a crankshaft position pulse 32.

In order to provide for a stable precise division of the period T, the peak value $V_f$ of the signal 40 must converge rapidly to a final value. It can be shown that whenever the rates of change of the signal 40 satisfy the following equation:

$$\frac{k_2}{k_1} < 1; \quad (2)$$

then the peak value of the signal 40 will rapidly converge toward a constant value, assuming that the period of the crankshaft position pulses does not change. Under this condition it can be shown that the duration of the logic state 37 of the signal 36 is equal to a precise fraction of the input signal period T. This relationship is illustrated in the following equation:

$$\frac{t_0 - t_1}{T} = \frac{k_2}{k_1 + k_2}, \quad (3)$$

wherein the quantity $t_0-t_1$ divided by T effectively represents the duty cycle of the waveform 36 and this quantity must be less than one-half due to the restrictions imposed by equation two. From equation three it can be seen that maintaining the rates $k_1$ and $k_2$ at constant values the signal 36 will be produced wherein the duration of the logic state 37 will be a precise constant fraction of the total period T. Since the duty cycle of the signal 36 will be constant, this waveform can now be used by electronic apparatus to accurately control the dwell and spark timing of an internal combustion engine ignition system.

Preferably, the rate (slope) $k_2$ is equal to one-half of the rate (slope) $k_1$. This results in the logic state 37 having a duration equal to one-third of the period T, while the logic state 38 exists for two-thirds of this period. The waveforms shown in FIGS. 4A–E are drawn to scale for such a rate relationship and illustrate that after one cycle (the distance between two sequential sensor pulses 32) the signal 40 has reached a peak value substantially equal to the final peak value $V_f$ and that the duration of the logic state 37 is substantially equal to one-third of the period T.

The waveforms in FIGS. 4A–E to the right of the breakpoint 30 show the signals developed at each of the terminals A–E after several cycles of an input sensor pulse period T' has existed. For these waveforms the peak values of the signal 40 have now converged to a level $V'_f$ which is less than the value $V_f$ shown to the left of the breakpoint 30. In general, the peak value of the waveform 40 can be represented by the following equation:

$$V_f = \frac{k_2 k_1}{k_1 + k_2}(T) + V_{ref} \quad (4)$$

From equation four and FIG. 4D it is clear that the positive peak magnitudes of the signal 40 occur at the occurrence of the input signal sensor pulses 32 (at the times $t_0$) and that the peak magnitudes of the signal 40 are directly proportional to the period of the crankshaft position sensor pulses 32, and therefore also inversely proportional to the rotational speed of the engine crankshaft. The fact that the peaks of the signal 40 occur at the occurrence of the crankshaft position sensor pulses 32 and that the magnitude of these peaks is related to engine speed permits the use of the waveform 40 to accurately monitor the engine speed. Subsequently, apparatus will be described which accomplishes the results mentioned in the preceding sentence.

FIG. 2 merely illustrates another embodiment of the dual slope rate changing circuit 13 shown in FIG. 1. In FIG. 2 the terminal C is coupled through a resistor 50 to the base of an NPN transistor 51 having its emitter connected to ground. The collector of the transistor 51 is coupled to the positive supply terminal 16 through a resistor 52 and to the negative input terminal of an operational amplifier 53 through a resistor 54. A positive input terminal of the amplifier 53 is connected to ground through a resistor 55 and to the positive supply terminal 16 through a resistor 56. The output of the operational amplifier 53 is directly connected to the terminal D and also connected to its negative input terminal through an integrating capacitor 57. Essentially, FIG. 2 merely represents another embodiment of the dual slope rate changing circuit 13.

In FIG. 1, the resistor 28 determines the amount of charging current contributed by the constant current source comprising the elements 27–29 while resistor 24 determines the discharging current produced by the constant current source comprising the elements 23–25. Actually, in the embodiment of the dual rate change circuit 13 in FIG. 1, the discharging current for the capacitor 26 is the current determined by the resistor 24 minus the current determined by the resistor 28, whereas the charging current for the capacitor is just the current determined by the resistor 28. The charging current determines the slope $k_2$, whereas the discharging current determines the slope $k_1$. In the embodiment of the dual slope circuit 13 shown in FIG. 1, it was found that if resistor 28 had a magnitude of 150 kohms and resistor 24 had a magnitude of 50 kohms, then the charging and discharging currents would be properly related so as to divide the input signal period T into one-third and two-thirds portions.

In the embodiment shown in FIG. 2, in response to the low logic state 37 being produced at the terminal C, the transistor 51 is turned off and the capacitor 57 is charged at a rate determined by the series resistance of the resistors 52 and 54. When the positive high logic state 38 is present at the terminal C, the transistor 51 is turned on and the capacitor 57 is discharged by a current essentially determined only by the magnitude of the resistor 54. By having resistor 52 equal to a 100 k and resistor 54 equal to 50 k, the circuit 13 in FIG. 2 will function substantially identically as the circuit 13 in FIG. 1. The feedback connection of a capacitor from the output of an operational amplifier to its input in order to implement an integrating circuit is well known to those skilled in the art.

FIG. 3 illustrates an engine speed monitoring circuit 90 which utilizes the signals produced by the signal generator 10 shown in FIG. 1 to produce an output at a terminal G which is representative of the speed of rotation of the engine crankshaft wherein the information at the terminal G is updated in response to each crankshaft position pulse 32 and wherein the speed indicating information is maintained at the terminal G until this information is updated.

In the speed monitoring circuit 90, the terminal D is directly coupled to the positive input terminal of a comparator 91 which has a negative input terminal coupled to ground through a resistor 92 and coupled to the positive supply voltage terminal 16 through a resistor 93. The output of the comparator 91 is provided at a terminal F which is connected to ground through a capacitor 94, connected to the terminal 16 through a resistor 95 and connected to a data terminal D" of a D-type flip-flop 96. The terminal A, at which the crankshaft position pulses 32 are produced, is directly connected to a clock terminal C" of the flip-flop circuit 96, and the reset terminal R" and the set terminals S" of the flip-flop are both connected to ground while an output terminal Q is directly connected to the terminal G. Alternatively, terminal B could be connected to terminal C" since the signal at terminal B also has transitions which coincide with the occurrence of the crankshaft position pulses 32.

Essentially, the crankshaft position sensor 11 produces the signal 31 which consists of the position pulses 32 that have a variable period T related to the rotational speed of the engine crankshaft. The flip-flop circuit 12, the dual slope integrator circuit 13 and the comparator 14 in FIG. 1 receive the signal 31 produced by the crankshaft sensor 11 and generate the periodic signal 40 in response thereto, wherein the signal 40 has a time varying magnitude which varies at the rates $k_1$ and $k_2$ and has a peak magnitude $V_f$ related to the period of the crankshaft position pulses 32. As previously mentioned, the peak magnitude $V_f$ of the varying signal 40 occurs at the time $t_0$ which coincides with the creation of the input signal pulses 32.

The engine monitoring circuit 90 essentially comprises a sampling circuit in which the crankshaft sensor signal 31 is applied to the clock terminal of the flip-flip 96 and the varying signal 40 is applied as an input to the comparator 91. The monitoring circuit 90 eventually produces an output signal 97 at the terminal G and the waveform of the signal 97 is shown in FIG. 4G. This output signal has a magnitude which is related to the peak magnitude $V_f$ of the varying magnitude signal 40 and the sampling means effectively utilizes the signal pulses 32 to insure that the magnitude of the varying signal 40, only during the occurrence of the signal pulses 32, is allowed to determine the magnitude of the output signal 97. This is accomplished in the following manner.

The comparator 91 essentially functions as an engine speed detector in that it compares the magnitude of the signal 40 with a predetermined reference level 98 corresponding to the voltage at the junction (also identified by the reference number 98) between the resistors 92 and 93. The reference level 98 is illustrated in FIG. 4D as corresponding to a constant voltage level. The output of the comparator 91 is produced at the terminal F and comprises a signal 99 consisting of high logic states 100 corresponding to when the magnitude of the signal 40 exceeds the reference level 98 and low logic states 101 corresponding to the opposite condition. The signal 99 is supplied to the data terminal D" of the flip-flop 96 and in response to the presence of a crankshaft position pulse 32 at the clock terminal C", the signal 97 produced at the terminal G is updated so that it provides an indication of the engine speed. This is because when a positive transition of the signal 31 occurs at the times $t_0$, then the logic state at the output terminal Q of the flip-flop 96 is set in accordance with the logic state present at the terminal D".

FIG. 4D illustrates that for a relatively slow engine speed having a period T, the peak magnitude $V_f$ will exceed the reference level 98 at the time $t_0$ and this will create high logic states 100 in the signal 99. Since the crankshaft pulses are created at the times $t_0$, the logic state of the output signal 97 will therefore reflect the logic state of the signal 99 at the terminal F at the times $t_0$. For a high engine speed corresponding to the period T', FIG. 4D illustrates that the peak magnitude of the waveform 40 will not exceed the reference level 98. Thus no high logic states 100 will be produced in the signal 99 and the terminal G will be maintained at a low logic state.

The basic advantage of the circuit 90 is that a signal (97) is produced related to engine speed while the magnitude of this signal is effectively updated for each crankshaft pulse 32 while the previous signal magnitude is maintained until the occurrence of the signal 32. Using techniques similar to those of circuit 90, monitoring circuits can be designed in which the magnitude of the speed monitoring output signal is an analog signal whose magnitude varies in direct proportion to the magnitude of the engine speed sampled at each pulse 32.

while I have shown and described a specific embodiment of this invention, further modifications and improvements will occur to those skilled in the art. All modifications which retain the basic underlying principles disclosed and claimed herein are within the scope of this invention.

I claim:

1. An engine speed monitoring circuit comprising:

sensor means for producing variable period signal pulses wherein the period of the pulses is related to engine speed;

means coupled to said sensor means for receiving said signal pulses and periodically generating, in response thereto, a signal having a magnitude varying at at least a predetermined rate and having a peak magnitude related to the period of the signal pulses, the peak magnitude thereby also being related to engine speed, and wherein said peak magnitude occurs at the occurrence of said input signal pulses; and sampling means coupled to said sensor means and said varying magnitude signal generating means for producing an output signal having a magnitude related to the peak magnitude of said varying magnitude signal by utilizing said signal pulses to insure that the magnitude of said varying signal, only substantially at the occurrence of said signal pulses, determines said output signal, said output signal magnitude being maintained after the occurrence of each of said signal pulses until the next updating of the output signal magnitude at the next occurrence of said signal pulses, said sampling means including a controllable gate means connected in series between said varying magnitude signal generating means and said output signal, said gate means having a control terminal receiving said signal pulses which result in effectively closing said gate means only during the occurrence of said signal pulses to provide a series signal path between said varying magnitude signal generating means and said output signal only at the occurrence of said signal pulses.

2. An engine speed monitoring circuit according to claim 1 wherein said gate means comprises a flip-flop circuit and said control terminal corresponds to a clock terminal of said flip-flop circuit, said varying magnitude signal being coupled to a data terminal of said flip-flop circuit.

3. An engine speed monitoring circuit according to claim 2 wherein said sampling means includes an engine speed detector comparator means having one input receiving said varying magnitude signal and another input receiving a predetermined reference level, and wherein the output of said comparator means is supplied to a data terminal of said flip-flop and said output signal is provided at an output terminal of said flip-flop.

* * * * *